United States Patent
Zhang et al.

(10) Patent No.: US 7,615,728 B2
(45) Date of Patent: Nov. 10, 2009

(54) SIGNAL PROCESSING METHOD AND DEVICE FOR MULTI APERTURE SUN SENSOR

(75) Inventors: Guangjun Zhang, Beijing (CN); Jie Jiang, Beijing (CN); Qiaoyun Fan, Beijing (CN)

(73) Assignee: Beihang University, Beijing (CN)

( * ) Notice: Subject to any disclaimer, the term of this patent is extended or adjusted under 35 U.S.C. 154(b) by 33 days.

(21) Appl. No.: 11/967,772

(22) Filed: Dec. 31, 2007

(65) Prior Publication Data
US 2008/0317283 A1    Dec. 25, 2008

(30) Foreign Application Priority Data
Jun. 22, 2007    (CN) .................. 2007 1 0117761

(51) Int. Cl.
  *G01C 21/02*    (2006.01)
  *G01J 1/20*    (2006.01)
(52) U.S. Cl. ................. 250/203.4; 250/203.3; 702/95; 33/268
(58) Field of Classification Search ............... 250/203.1, 250/203.3, 203.4; 702/85, 95, 150; 33/268–271; 356/141.2
See application file for complete search history.

(56) References Cited

U.S. PATENT DOCUMENTS

| | | | | |
|---|---|---|---|---|
| 4,999,483 A | * | 3/1991 | Okamoto | 250/203.1 |
| 5,455,415 A | * | 10/1995 | Yamada et al. | 250/214.1 |
| 2008/0029652 A1 | * | 2/2008 | Zhang et al. | 244/164 |

* cited by examiner

*Primary Examiner*—Kevin Pyo
(74) *Attorney, Agent, or Firm*—Workman Nydegger

(57) ABSTRACT

The disclosure relates to a signal processing method for multi aperture sun sensor comprising the following steps: reading the information of sunspots in a row from a centroid coordinate memory, judging the absence of sunspots in that row, identifying the row and column index of the sunspots in the complete row, selecting the corresponding calibration parameter based on the row and column index, calculating attitude with the attitude calculation module the corresponding to identified sunspots, averaging the accumulated attitude of all sunspots and outputting the final attitude. At the same time, a signal processing device for multi aperture sun sensor is also presented. It is comprised of a sunspot absence judgment and an identification module and an attitude calculation module. The disclosure implements the integration of sun sensors without additional image processor or attitude processor, reduces field programmable gate array resource and improves the reliability of sun sensors.

11 Claims, 4 Drawing Sheets

SIGNAL PROCESSING METHOD AND DEVICE FOR MULTI APERTURE SUN SENSOR

CROSS-REFERENCE TO RELATED APPLICATIONS

This application claims priority from Chinese Patent Application Serial No. 200710117761.5 filed Jun. 22, 2007, the disclosure of which, including the specification, drawings and claims, is incorporated herein by reference in its entirety.

TECHNICAL FIELD

The present disclosure relates to a signal processing method and device for sun sensor. In particular, the disclosure relates to signal processing method and device of multi aperture structure sun sensor.

BACKGROUND

Sun sensors are widely used in spacecraft attitude determination subsystems to provide a measurement of a sun vector in a spacecraft coordinate. They have wide applications in attitude measurement and control of satellite and other space vehicles. A novel complementary metal oxide semiconductor ("CMOS") sun sensor includes: an optical system with single aperture or multi aperture, electronic system and process computer based on a field programmable gate array ("FPGA") or an advanced RISC machines ("ARM"). The principle of sun sensors is that the sunlight is incident on the CMOS image sensor, and sunspots are formed through the apertures of an optical system. The positions of sunspots vary with different incidence angles. Then image processing and attitude calculation are done by an electronic system and process computer to provide the corresponding attitude angle of the satellite.

The operation mode of the developed CMOS sun sensor is: image grabbing, simple image processing and communication with process computer, which is accomplished by the electronic system; further image processing (e.g. the centroid calculation, sunspot identification and attitude calculation) that is implemented by the process computer. The function of a kind of sun sensor electronic systems is: image grabbing, image segmentation and transmission of sunspot information above the threshold to the process computer. The function of another kind of electronic systems is only image grabbing while image processing and attitude calculating are accomplished by the process computer. In the two operation modes the burden of process computer is increased and the amount of image data to be transmitted to process computer is large because of full frame data transmission which limits the attitude update rate of sun sensor.

And moreover, when the aperture of the optical system is polluted and some apertures can not pass the sunlight, the attitude must still be calculated accurately, and the reliability of the sun sensor must be improved.

SUMMARY

Accordingly, it is the purpose of the present disclosure to provide a signal processing method for a multi aperture sun sensor which has high reliability.

It is another purpose of this disclosure to provide a signal processing device for a multi aperture sun sensor which outputs the attitude directly and results in the integration of a sun sensor.

For these purposes, this disclosure is implemented as follows:

One embodiment of the disclosed the signal processing method for multi aperture sun sensor presented herein comprises the following steps:

(A) reading the information of sunspots in a row from a centroid coordinate memory, and accumulating a sunspot number;

(B) judging absence of sunspots in that row; that is comparing the accumulated sunspot number in step A with the preset sunspot number; if the two numbers are equal, the sunspots in the row are complete, then the method proceeds to step C; if the accumulated sunspot number is less than the preset sunspot number, the sunspot in the row is absent, then the method proceeds to step F;

(C) comparing the column coordinate of the sunspots in the row one by one, finding the sunspot which has the maximum column coordinate, recording the column index and the storage address; selecting the corresponding calibration parameter based on the row and column index, and outputting the centroid coordinate of the sunspot and calibration parameter to an attitude calculation module;

(D) calculating the attitude corresponding to the identified sunspots and accumulating the results;

(E) judging whether the identification of sunspots in the current row is finished, if not, clearing the column coordinate value of the identified sunspot, adding 1 to the column index, then returning to step C, beginning to identify the next column sunspots, and if the identification of the sunspots in the current row is finished, then proceeding to step F;

(F) judging whether the identification of all row sunspots is finished, if not, adding 1 to the row index, then returning to step A, if so, averaging the accumulated attitude of all sunspots in step D, and outputting the final attitude.

Step A of the method further comprises:

(A1) reading the centroid's row coordinates of two sunspots which are stored adjacently jn the centroid's row coordinate memory, and accumulating the number of the sunspots;

(A2) calculating the difference between the row coordinates of the two sunspots, and comparing the result with the preset constant, if the result is less than the constant, then returning to step A1, else it means the disposal of sunspots in the current row is finished, recording the current row sequence, and stopping accumulating operation.

The calibration parameter further comprises: coordinate origin of the aperture corresponding to the sunspot and the focal length between the aperture and an image sensor.

The attitude angle is calculated based on the centroid coordinate of the sunspot and the calibration parameter in step D, wherein an arc tangent, square and square root operator are implemented with a coordinate rotation digital computer ("CORDIC") algorithm.

Based on the above described method it is possible to achieve a signal processing device for multi aperture sun sensor which comprises: a sunspot absence judgment and an identification module and an attitude calculation module. The sunspot absence judgment and identification module, for judging the absence of sunspots in a row, identifies the sunspots in the a complete row, and outputs a centroid coordinate and calibration parameter of identified sunspots to the attitude calculation module.

The attitude calculation module calculates the final attitude angle according to the centroid coordinate and the corresponding calibration parameter of the sunspots.

The sunspot absence judgment and identification module comprises a subtracter, a row coordinate comparator, a column coordinate comparator, a read address generator, a clear controller, multiplexer, a calibration parameter memory, a sunspot absence judgment state machine and a sunspot identification state machine. The subtracter calculates the difference of the centroid coordinates of the two sunspots which are stored adjacently, and sends the result to the row coordinate comparator. The row coordinate comparator compares the difference with the preset constant which has the same row space, and outputs the result to the sunspot absence judgment state machine.

The sunspot absence judgment state machine sends the control signal to the read address generator, judging the absence based on the results of the row coordinate comparator and sunspots numbers, outputting the row index of sunspots in the complete row to the multiplexer, and outputting the first address of sunspots in the complete row and a sunspot identification enable signal to the sunspot identification state machine.

The read address generator generates the row and column address signal of centroid according to the control signal from the sunspot absence judgment state machine and the sunspot identification state machine.

The column coordinate comparator compares the column coordinates of the sunspots in the complete row, and outputs the results to the sunspot identification state machine.

The sunspot identification state machine sends the control signal to read address generator, identifies the column index of sunspots based on the column coordinate of the sunspots in the complete row, outputs the identified index of sunspots to the multiplexer, and sends the control signal to the clear controller.

The clear controller clears the column coordinate value of the identified sunspots according to the control signal from the sunspot identification state machine.

The multiplexer selects the calibration parameter for the identified sunspots according to the row index of the sunspots from the sunspot absence judgment state machine and the column index of sunspots from the sunspot identification state machine and outputs the calibration parameter to the attitude calculation module.

The calibration parameter memory stores the calibration parameter of all the corresponding sunspots.

The attitude calculation module further comprises: a X subtracter, a Y subtracter, a first arc tangent operator, a second arc tangent operator, a mod operator, and an attitude calculation state machine. The X subtracter calculates the difference between the column coordinate of sunspots with the origin of the aperture. The Y subtracter calculates the difference between the row coordinate of sunspots with the origin of the aperture.

The first arc tangent operator calculates the yaw angle based on the results of the X subtracter and the Y subtracter with the CORDIC algorithm, and outputs the results to the attitude calculation state machine.

The mod operator calculates the mod of the complex number based on the results of the X subtracter and the Y subtracter with the CORDIC algorithm. The second arctangent operator calculates the pitch angle based on the mod from the mod operator and the focal length between the aperture and the image sensor, and outputs the results to attitude calculation state machine.

The attitude calculation state machine controls the attitude calculation module to implement all operations, and outputs the final attitude.

The advantages of the presented disclosure are as follows:

1) A single FPGA is used in this disclosure to accomplish signal processing of multi aperture sun sensors and output an attitude angle directly without a large number of data transmission. At the same time the disclosure implements the integration of sun sensors without an additional image processor or attitude processor.

2) The sunspot absence judgment is realized in this disclosure based on the characters of the sunspots image. So the signal processor and sun sensor will still work even when some of the aperture is polluted, which improves the reliability of the sun sensor.

The CORDIC algorithm is used in this disclosure to accomplish the operation of the arc tangent, square and square root in the attitude calculation which reduces a lot of FPGA resource for only using adder or subtracter without a complicated multiplier.

BRIEF DESCRIPTION OF THE DRAWINGS

The accompanying drawings, which are incorporated in and constitute a part of the specification, illustrate an exemplary embodiment of the present disclosure and, together with the general description given above and the detailed description of the embodiment given below, serve to explain the principles of the present disclosure.

DETAILED DESCRIPTION

Figure 1:
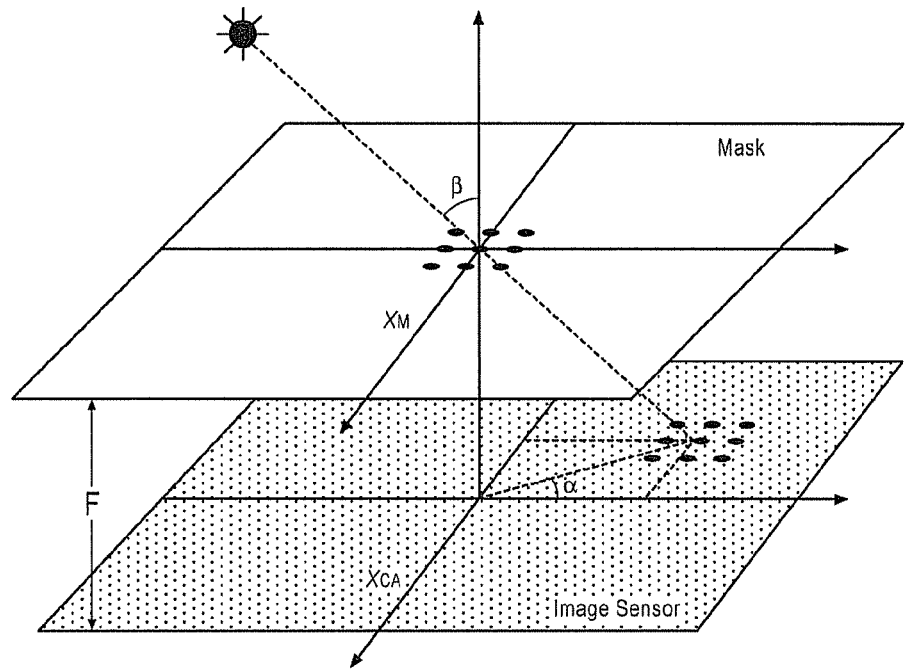
FIG. 1 illustrates operating principles of a sun sensor.

While the claims are not limited to the illustrated embodiments, an appreciation of various aspects of the present disclosure is best gained through a discussion of various examples thereof. Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

The principle of the present sun sensor as shown in FIG. 1 is: the sunlight is incident on the CMOS image sensor and sunspots are formed through apertures of the optical system. The different sunspot positions are determined by the different incident angles. The incident angle of sunlight is calculated by a signal processing device based on the sunspot position and attitude of a satellite is determined.

Figure 2:
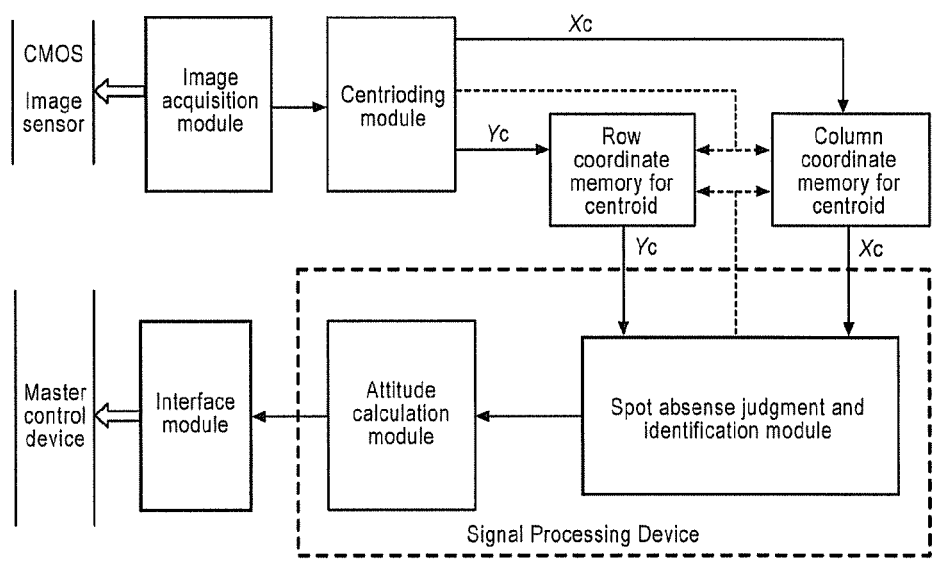
FIG. 2 illustrates a block diagram of the sun sensor.

A block diagram of the sun sensor is illustrated in FIG. 2. The dash line partition in the FIG. 2 is the signal processing device. The process of the sun sensor is as follows. First, the image grabbing module outputs a coordinate and a gray value of each pixel of the sunspot image. The sunspot centroid calculation module distinguishes each sunspot according to these values, computes each sunspot centroid coordinate and stores the centroid coordinate to the row and column memory. The signal processing device reads sunspot centroid coordinate, identifies the row and column index of the sunspot, selects the calibration parameter based on the row and column index, calculates the attitude angle corresponding to the sunspot, and obtains the final attitude angle by averaging the attitude angles corresponding to all sunspots. Finally, an interface module sends the final attitude to a main control device of satellite. The centroid calculation module computes the centroid coordinate of every sunspot and stores the coordinate in memory. The detail of this process may be found in a co-pending patent application, entitled "Rapid and high precision centroiding method and system for sunspots image", U.S. patent application Ser. No. 11/687,338, invented by Zhang Guangjun et al, the contents of which are incorporated herein by reference in its entirety.

Figure 3:
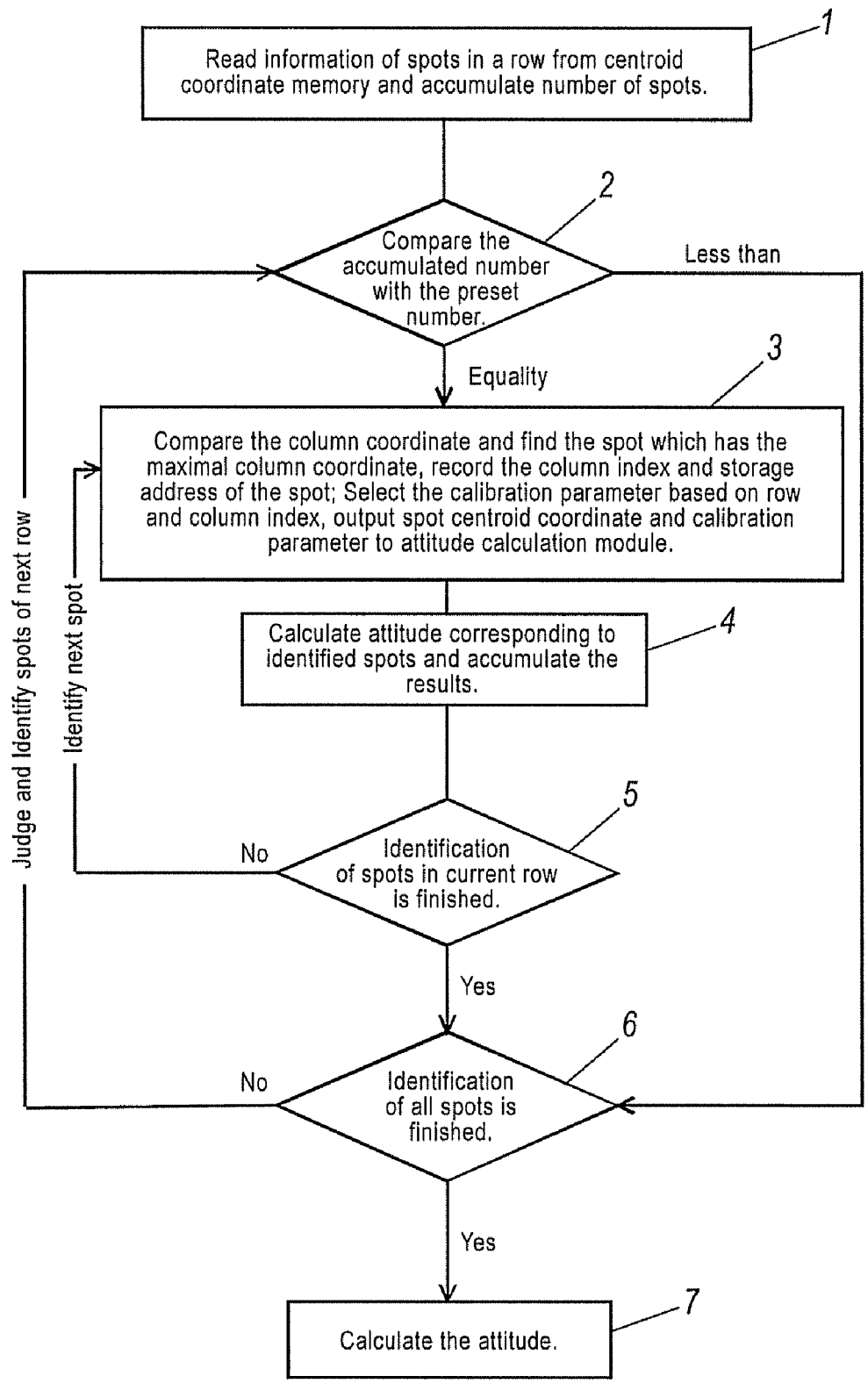
FIG. 3 illustrates a schematic drawing of sunspot images of the sun sensor.

FIG. 3 illustrates a schematic drawing of sunspot images of the sun sensor. According to the process of the centroid calculation module, the centroid coordinates are stored in the memory line by line, but the centroid coordinates in the same row are stored randomly. So after identifying the column index of the sunspots in same row, the calibration parameters are picked up for each sunspot and the attitude is calculated. Besides, the apertures may be polluted in practical applications, some apertures may be blocked up, and some sunspots may be absent. To reduce the complexity of the calculation, if the sunspots in a row are absent, the sunspots do not participate in the attitude calculation, so the sunspot absence judgment is needed for sunspots in a row.

The signal processor of the sun sensor in this disclosure realizes the sunspot absence judgment of the sun sensor, the sunspot identification and the attitude calculation based on very-high-speed integrated circuit hardware description language ("VHDL") and a single FPGA.

Figure 4:
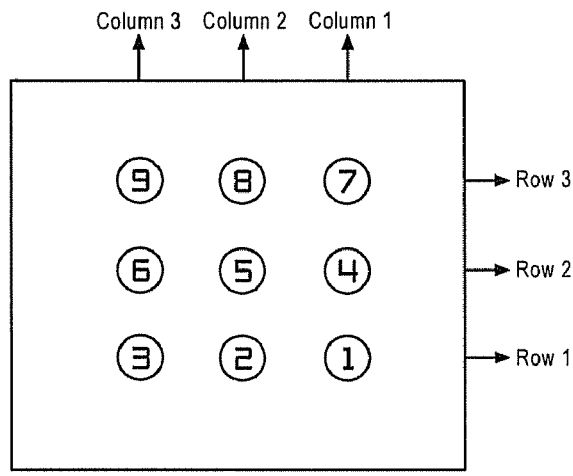
FIG. 4 illustrates a workflow diagram of a signal processing method.

In particular, taking a 3×3 aperture array as an example, as shown by FIG. 4, the steps are as follows:

Step 1: reading the information of the sunspots in a row from the centroid coordinate memory, and accumulating a sunspot number. The constant Ycspace is the row coordinate space and is set with the maximum difference of a centroid's row coordinate Yc of the sunspots in the same row. Ycspace is generally a 10 pixels size according to the space between apertures of the mask, but the difference of centroid's row coordinate Yc of different row sunspots is larger than Ycspace. Based on this character, reading the centroid's row coordinates of sunspots from the centroid row coordinate memory one by one, and accumulating the sunspot number L; comparing the difference of row coordinates of two sunspots which are stored adjacently with Ycspace, if the difference less than Ycspace, continuing reading the next sunspot, and calculating the difference of row coordinates of two adjacently stored sunspots; when the difference larger than Ycspace, it means that the process of sunspots in current row is finished, stopping the accumulation and recording the row index n.

In Step 2, the absence of sunspots in that row is judged. That is, the accumulated sunspot number (L) is compared with the due sunspot number (3). If the accumulated sunspot number less than the due sunspot number, i.e. L<3, so the sunspots in the current row are absent, then the process proceeds to step 6. However, if the two numbers are equal, so the sunspots in the current row are complete, the row index n is output to the multiplexer and the first address of the sunspots in the row to the sunspot identification state machine. The process then proceeds to step 3.

In Step 3 the column coordinate of the sunspots is compared in the row one by one from the first storage address of the sunspots in the row, and the sunspot which has the max column coordinate is found and recorded in the column index m and the storage address. The column index m is output to the multiplexer and the calibration parameter is selected according to the column index. The centroid coordinate iof the sunspot and calibration parameter is output to the attitude calculation module.

The calibration parameters are the preset parameters corresponding to each sunspot, which relates to physical structure of the optical system. The parameter of each sunspot is slightly different according to the different physical structure. (Xc_nm,Yc_nm) is the centroid coordinate of the nmth sunspot, X0_nm, Y0_nm and Fnm are its corresponding calibration parameters, and X0_nm, Y0_nm are coordinate origin of the nmth sunspot. Fnm is the focal length between the aperture corresponding to the nmth sunspot and the image sensor.

In Step 4 the yaw angle αnm and pitch angle βnm is calculated corresponding to the identified sunspot and accumulated to Sumαnm and Sumβnm respectively.

The yaw αnm and pitch βnm of the nmth sunspot are presented as follows, $$\begin{bmatrix} X_{c\_nm} - X_{0\_nm} \\ Y_{c\_nm} - Y_{0\_nm} \\ F_{nm} \end{bmatrix} = \begin{bmatrix} e1 \\ e2 \\ e3 \end{bmatrix} \quad (1)$$

$$\alpha_{nm} = \arctan(e2/e1), \beta_{nm} = \arctan\left(e3/\sqrt{e1^2 + e2^2}\right) \quad (2)$$

The arc tangent operation is realized with the CORDIC algorithm. The square and square root are also implemented with the CORDIC algorithm by regarding them as the mod of complex e1+e2i. The calculation precision of attitude angle is set to 0.007°. Therefore, the word length is 16 bits in arc tangent and mod operation, and the iteration times are 13. According to different precision requirements, the different word length and iteration times can be set correspondingly.

In Step 5 the identification of sunspots in the current row is judged to determine if it is finished. If not finished, the column coordinate value of the identified sunspot is cleared, adding 1 to the column index m, then the process returns to step 3, starting to identify the m+1th column sunspot. If the identification of sunspots is judged to be finished, the process proceeds to step 6.

In Step 6 it is judged whether all row sunspots are identified. If all of the row sunspots are not identified, 1 is added to the row index n, then the process returns to step 1. If all of the row sunspots are identified, then the process proceeds to step 7.

In Step 7, the accumulated attitude angles Sumαnm and Sumβnm of all sunspots in the complete rows are averaged and the final attitude angles of sun sensors, α, β are obtained.

To realize the method mentioned above, a corresponding signal processing device for multi apertures sun sensor is presented in this disclosure. The device comprises: a sunspot absence judgment and identification module and an attitude calculation module. The sunspot absence judgment and identification module, which judges the absence of the sunspots in a row, identifies the sunspots in a complete row, and outputs centroid coordinates and calibration parameters of identified sunspots to the attitude calculation module. The attitude calculation module calculates the final attitude angle according to the centroid coordinates and the corresponding calibration parameters of the sunspots. The specific function of each module is described below.

Figure 5:
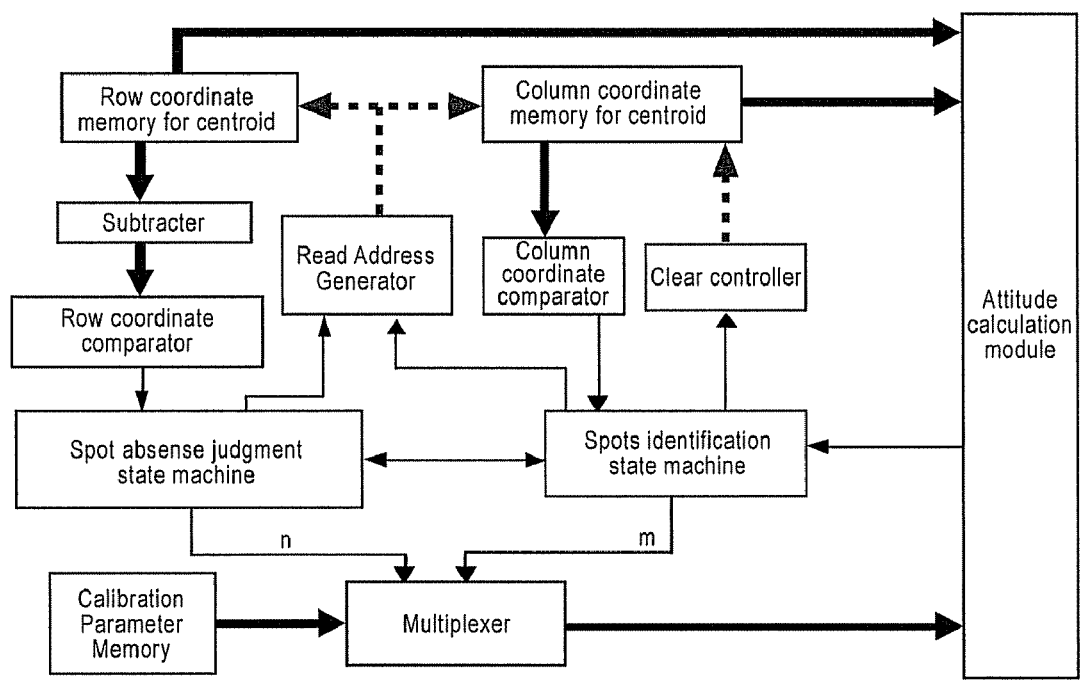
FIG. 5 illustrates an architecture diagram of a sunspot absence judgment and identification module.

The architecture diagram of sunspot absence judgment and identification module is shown in FIG. 5. It is comprised of a subtracter, a row coordinate comparator, a column coordinate comparator, a read address generator, a clear controller, a multiplexer, a calibration parameter memory, a sunspot absence judgment state machine and a sunspot identification state machine.

The sunspot absence judgment state machine judges whether there is absence sunspot in each row and outputs the row index of sunspots in the complete row to the multiplexer and the first address to the sunspot identification state machine. The sunspot absence judgment state machine has five states: an idle state, a centroid's row coordinate read state, a row coordinate comparison state, an absent judgment state and an end of frame judgment state. The work process is described as follows: The power-on reset signal of sun sensor sets the sunspot absence judgment state machine to the idle state. In the idle state, all variables will be set to their initial values, and the enable signal is checked continuously whether it is 1. After the centroid calculation circuit finishes the calculation and the storage of all sunspots' centroid, the enable signal will be set to 1. Once the sunspot absence judgment state machine finds that, it will enter into the centroid's row coordinate read state. In this state, the adjacently stored sunspots' row coordinate $Yc[i]$ and $Yc[i+1]$ are read from the row coordinate memory, and then they are sent to the subtracter for the subtract operation (i is a variable for all sunspots, its initial value is 0). At the same time, the number of sunspots in the row is accumulated in the variable L. Then the subtract result Sub is sent to the row coordinate comparator, then the sunspot absence judgment state machine enters into the row coordinate comparison state. In this state, the outputs of the subtracter Sub and the Ycspace are compared. If Sub is less than Ycspace, it means the process of the sunspots in the current row is not finished. The variable is added 1, the sunspot absence judgment state machine returns to the centroid's row coordinate read state, and reads the centroid's row coordinate of the next sunspot. If Sub is larger than Ycspace, it means the process of the sunspots in the current row is finished. The sunspot absence judgment state machine enters into the absent judgment state. The sunspot absence judgment state machine judges the read sunspots number L, if L is less than 3, it means the absence exists in the current row, an absence flag is set to 1. The sunspot absence judgment state machine enters into the end of frame judgment state. If L is equal to 3, it means there is no absence in the current row, the absence flag is set to 0, and the identification enable signal is set to 1. The first storage address of sunspots in the current row is sent to the sunspot identification state machine, the row index n of the sunspots in the current row is sent to the multiplexer, and then the sunspot identification state machine is waited to set the sunspot identification end flag to 1, and then the sunspot absence judgment state machine enters into the end of frame judgment state. In this state, the identification enable signal is set to 0, variable L is cleared, and the sunspot absence judgment state machine judges whether the current row is the last row in the sunspot image. When the centroid coordinates of sunspots are stored, a 0 is stored after the centroid coordinate of the last sunspot. So if the content in the centroid coordinate memory is 0, the current row is the last row in the frame, if not, the row index n is added 1, then returns to the centroid's row coordinate read state, and starts the absence judgment of the sunspots in the next row. If the current row is the last row, the end of frame flag is set to 1, the sunspot absence judgment state machine waits for the image grabbing module to set the image enable signal to 1, the sunspot absence judgment state machine returns to the idle state again.

The sunspot identification state machine identifies the column index if sunspots in the complete row according to the identification enable signal from the sunspot absence judgment state machine, and outputs the identified column index to the multiplexer. The sunspot identification state machine has six states: an idle state, a centroid's column coordinate read state, a column coordinate comparison state, a calibration parameter selection state, a next column identification state and an end of the current row identification state. The work process is as follows: The power-on reset signal of sun sensor sets the sunspot identification state machine to the idle state. In the idle state, all variables will be set to their initial values. The identification state machine checks the identification enable signal continuously whether it is 1. After the sunspot absence judgment state machine sets it to 1, the sunspot identification state machine enters into the centroid's column coordinate read state. In this state, the adjacently stored centroid's column coordinates are read in turn beginning from the first storage address, and are sent to the column coordinate comparator. Then the sunspot identification state machine enters into the column coordinate comparison state. In this state, the column coordinate values of the two sunspots are compared. The storage address of the lager column coordinate value is stored. The read sunspot is judged whether it is the last sunspot of the row. If not, returns to the centroid's column coordinate read state, reads the column coordinate value of the next sunspot to compare. If so, records the column index m and its storage address of the sunspot with the max column coordinate value, outputs the column index m to the multiplexer. The read address generator sends the centroid's row and column coordinate values $Xc\_nm$ and $Yc\_nm$ to the attitude calculation module according to the storage address of the sunspot with the max column coordinate value from the sunspot identification state machine. Then the sunspot identification state machine enters into the calibration parameters selection state. In this state, according to the row index n from the sunspot absence judgment state machine and column index m from the sunspot identification state machine, the multiplexer selects the calibration parameter $x0\_nm$, $y0\_nm$, $F\_nm$ corresponding to nth row and mth column sunspot, transfers to the attitude calculation module, and sets the attitude calculation enable signal to 1. After the attitude calculation state machine sets the end flag of sunspot attitude calculation to 1, the sunspot identification state machine enters into the next identification state. In this state, the clear controller controlled by the sunspot identification state machine sets the column coordination value of the current identified sunspot to 0 to find the next maximum in the current row, and the attitude calculation enable signal is set to 0. The column index m is judged whether it equals to 3, If not, the column index m is added 1, returns to the centroid's column coordinate read state, and begins to identify the next sunspot of the current row. If so, it means that the identification of sunspots in the current row is finished. The sunspot identification state machine enters into the end of row identification state. In this state, the end flag of the sunspots identification in the row is set to 1, the sunspot identification state machine returns to the idle state, waits the identification enable signal to be set to 1, then enters sunspots identification of the next complete row.

Figure 6:
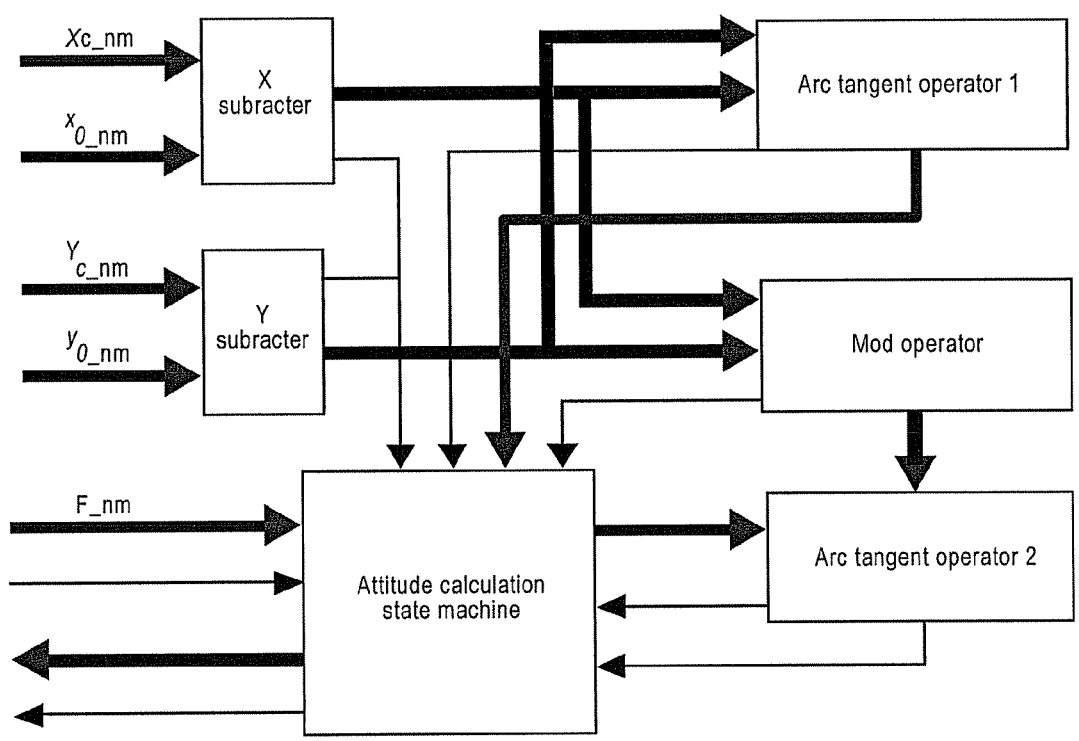
FIG. 6 illustrates an architecture diagram of an attitude calculation module.

The architecture diagram of attitude calculation module is showed in FIG. 6. It is composed of an X subtracter, a Y subtracter, an arc tangent operator 1, 2, a mod operator and an attitude calculation state machine. The arc tangent operator 1, 2 and the mod operator are based on the CORDIC algorithm, which is a kind of iterative algorithm that can be used to calculate many complex functions such as trigonometric function and the mod of complex number and so on. Without a multiplication and division, the CORDIC algorithm can save a lot of resources.

The attitude calculation state machine has seven states: an idle state, a subtract operation state, a αnm calculation state, a mod operation state, a βnm calculation state, a next sunspot attitude calculation state and an average calculation state. The work process of the attitude calculation state machine is as follows: The power-on reset signal sets the attitude calculation state machine to the idle state. In the idle state, all variables will be set to their initial values, and then the attitude state machine will check the attitude calculation enable signal continuously whether it is 1. When the sunspot identification state machine sets the attitude calculation enable signal to 1, the attitude calculation state machine enters into the subtract operation state. In this state, a subtraction of Xc_nm, which is from the centroid's column coordinate memory, and the relevant calibration parameter x0_nm, which is from the multiplexer, are made in the X subtractor. According to formula (1), the output of subtractor is e1, which is sent to the arc tangent operator 1 and the mod operator. Another subtraction of Yc_nm, which is from the centroid's row coordinate memory, and the relevant calibration parameter y0_nm, which is from the multiplexer, are made in the Y subtractor. According to formula (1), the output of the subtractor is e2, which is sent to the arc tangent operator 1 and the mod operator. Then the subtraction end flag is set to 1, the attitude calculation state machine enters into the αnm calculation state. In this state, the arc tangent operator 1 calculates the arc tangent αnm of e2/e1, and the results are accumulated to the attitude accumulation Sumα, After the αnm calculation end flag is set to 1, the attitude calculation state enters into the mod operation state. In this state, the mod operator calculates the mod magnitude of complex number e1+e2$i$, and F_nm which is the output of the multiplexer is assigned to e3 simultaneously. When the mod operation is finished, the attitude calculation state machine sets the mod operation end flag to 1, and enters into the βnm calculation state. In this state, the arc tangent operator 2 calculates the arc tangent βnm of magnitude/e3, and the results are accumulated to the attitude accumulation Sumβ, at the same time variable K of all sunspot numbers which participate in the calculation is also accumulated. When the βnm calculation end flag is set to 1, the attitude calculation state machine enters into the next sunspot attitude calculation state. In the next sunspot attitude calculation state, the sunspot attitude calculation end flag is set to 1. The end flag of frame is judged whether it is 1. If not, the attitude calculation state machine returns to the idle state, and waits the next sunspot attitude calculation. If so, the attitude calculation state machine enters into the average calculation state. In the average calculation state, the attitude calculation state machine averages the attitudes of K sunspots which participate in the calculation, i.e. α=Sumα/K, β=Sumβ/K, obtains the final attitudes α and β then outputs the α and β to the interface module, then the attitude calculation state machine returns to the idle state again.

A processor implemented with the method and device in this disclosure occupies resource of FPGA: 1200 Slice Flips, 1502 LUTs, 2 BRAMs, the maximum time delay is 22.36 ns. The accuracy of the attitude angle calculation is 0.007 degrees. The accuracy of the existing sun sensor with the mounting error and the calibration error is only 0.02 degrees, so the accuracy of attitude calculation is enough for the requirement of sun sensors. The resource occupied by attitude calculation module is 10% less than the resource occupied by traditional methods.

The foregoing description of various embodiments of the disclosure has been presented for purposes of illustration and description. It is not intended to be exhaustive or to limit the invention to the precise embodiments disclosed. Numerous modifications or variations are possible in light of the above teachings. The embodiments discussed where chosen and described to provide the best illustration of the principles of the disclosure and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A signal processing method for a multi aperture sun sensor to determine an attitude, the method comprising:
   A. reading information of sunspots in a row from a centroid coordinate memory with a programmable device included in the multi aperture sun sensor, and accumulating a sunspot number, wherein the information of sunspots is determined from a sunspot image on an image sensor included in the multi aperture sun sensor;
   B. judging an absence of sunspots in the row with the programmable device, by comparing the accumulated sunspot number in step A with a preset sunspot number; wherein if the two numbers are equal, the sunspots in the row are complete, and proceeding to step C; wherein if the accumulated sunspot number is less than the preset sunspot number, a sunspot in the row is absent, then proceeding to step F;
   C. comparing a column coordinate of the sunspots in the row one by one with the programmable device, finding the sunspot which has the maximum column coordinate, recording a column index and storage address for the maximum column coordinate; selecting a corresponding calibration parameter based on the row and column index, and outputting a centroid coordinate of the sunspot and calibration parameter to an attitude calculation module;
   D. calculating an attitude corresponding to the identified sunspots and accumulating the results with the programmable device;
   E. judging whether the identification of sunspots in the current row is finished with the programmable device, wherein if identification is not finished, clearing the column coordinate value of the identified sunspot, adding 1 to the column index, then returning to step C, beginning to identify the next column sunspots, wherein if identification is finished, proceeding to step F;
   F. judging whether the identification of all row of sunspots is finished with the programmable device, wherein if the identification of all row of sunspots is not complete, adding 1 to the row index, then returning to step A, wherein if the identification of all row of sunspots is complete, averaging the accumulated attitude of all sunspots in step D, and outputting the final attitude from the programmable device.

2. The signal processing method according to claim 1, wherein the step A further comprises:
   A1. reading the centroid's row coordinates of two sunspots which are stored adjacently in the centroid's row coordinate memory, and accumulating the number of the sunspots; and
   A2. calculating the difference between the row coordinates of the two sunspots, and comparing the result with the preset constant, wherein if the result is less than the constant, then returning to step A1, wherein if the result is not less than the preset constant, disposal of the sunspots in the current row is completed, and the current row index is recorded, thereby stopping accumulating process.

3. The signal processing method according to claim 1, wherein the calibration parameter further comprises:
a coordinate origin of the aperture corresponding to the sunspot and the focal length between the aperture and a image sensor.

4. The signal processing method according to claim 1, wherein the attitude angle is calculated based on the centroid coordinate of the sunspot and the calibration parameter in step D, wherein the arc tangent, square and square root operator are implemented with a coordinate rotation digital computer algorithm.

5. The signal processing method according to claim 2, wherein the attitude angle is calculated based on the centroid coordinate of the sunspot and the calibration parameter in step D, wherein the arc tangent, square and square root operator are implemented with a coordinate rotation digital computer algorithm.

6. The signal processing method according to claim 3, wherein the attitude angle is calculated based on the centroid coordinate of the sunspot and the calibration parameter in step D, wherein the arc tangent, square and square root operator are implemented with coordinate rotation digital computer algorithm.

7. A signal processing device for multi aperture sun sensor comprises:
a sunspot absence judgment and identification module and an attitude calculation module,
wherein the sunspot absence judgment and identification module judges the absence of sunspots in a row, identifies the sunspots in a complete row, and outputs a centroid coordinate and calibration parameter of identified sunspots to the attitude calculation module; and
wherein the attitude calculation module calculates the final attitude angle according to the centroid coordinate and the corresponding calibration parameter of the sunspots.

8. The signal processing device for multi aperture sun sensor according to claim 7, wherein the sunspot absence judgment and identification module comprises:
a subtracter, a row coordinate comparator, a column coordinate comparator, a read address generator, a clear controller, multiplexer, a calibration parameter memory, a sunspot absence judgment state machine and a sunspot identification state machine, wherein:
the subtracter calculates the difference of the centroid coordinates of the two sunspots which are stored adjacently and sends the result to the row coordinate comparator;
the row coordinate comparator compares the difference with a preset constant which has the same row space, and outputs the result to the sunspot absence judgment state machine;
the sunspot absence judgment state machine sends the control signal to the read address generator, judges the absence based on the results of the row coordinate comparator and sunspot numbers, outputs the row index of sunspots in the complete row to the multiplexer, and outputs the first address of sunspots in the complete row and a sunspot identification enable signal to the sunspot identification state machine;
the read address generator generates the row and column address signal of the centroid according to the control signal from the sunspot absence judgment state machine and the sunspot identification state machine;
the column coordinate comparator compares the column coordinates of the sunspots in the complete row, and outputs the results to the sunspot identification state machine;
the sunspot identification state machine sends the control signal to read address generator, identifying column index of sunspots based on the column coordinates of the sunspots in the complete row, outputs the identified index of sunspots to the multiplexer, and sends the control signal to the clear controller;
the clear controller clears the column coordinate value of the identified sunspots according to the control signal from the sunspot identification state machine;
the multiplexer selects the calibration parameter for the identified sunspots according to the row index of the sunspots from the sunspot absence judgment state machine and the column index of sunspots from the sunspot identification state machine, and outputs the calibration parameter to the attitude calculation module, and
the calibration parameter memory stores the calibration parameter of all the corresponding sunspots.

9. The signal processing device for multi aperture sun sensor according to claim 7 wherein the attitude calculation module further comprises:
an X subtracter, a Y subtracter, a first arc tangent operator, a second arc tangent operator, a mod operator, and an attitude calculation state machine;
wherein the X subtracter calculates the difference between the column coordinate of sunspots with the origin of the aperture;
wherein the Y subtracter calculates the difference between the row coordinate of sunspots with the origin of the aperture;
wherein the first arc tangent operator calculates a yaw angle based on the results of the X subtracter and the Y subtracter with a coordinate rotation digital computer algorithm, and outputs the results to the attitude calculation state machine;
wherein the mod operator calculates a mod of a corresponding complex number based on the results of X subtracter and Y subtracter with the coordinate rotation digital computer algorithm;
wherein the second arc tangent operator calculates a pitch angle based on the mod from the mod operator and a focal length between the aperture and the image sensor, and outputs the results to attitude calculation state machine;
wherein the attitude calculation state machine controls the attitude calculation module to implement all operations and outputs the final attitude.

10. The method according to claim 1, wherein the programmable device comprises at least one of a field programmable gate array or an advanced RISC machine.

11. The signal processing device for multi aperture sun sensor according to claim 7, wherein the sunspot absence judgment and identification module, the attitude calculation module are integrated into a single programmable device, wherein the programmable device is at least one of a field programmable gate array or an advanced RISC machine.

* * * * *